(12) United States Patent
Martel

(10) Patent No.: US 6,527,319 B1
(45) Date of Patent: Mar. 4, 2003

(54) PORTABLE VEHICLE FINISH PROTECTION APPARATUS

(76) Inventor: Maureen M. Martel, 2222 Montclair St., Sarasota, FL (US) 34231

( * ) Notice: Subject to any disclaimer, the term of this patent is extended or adjusted under 35 U.S.C. 154(b) by 0 days.

(21) Appl. No.: 10/013,227

(22) Filed: Dec. 10, 2001

(51) Int. Cl.$^7$ ............................................... B60R 19/42
(52) U.S. Cl. ........................................ 293/128; 428/31
(58) Field of Search ................................ 293/128, 102, 293/126, DIG. 6; 428/31

(56) References Cited

U.S. PATENT DOCUMENTS

| 3,309,129 A | * | 3/1967 | Newman et al. | |
|---|---|---|---|---|
| 3,687,502 A | * | 8/1972 | Loew | |
| 3,982,780 A | * | 9/1976 | Keith | |
| 4,066,285 A | * | 1/1978 | Hall et al. | |
| 4,260,655 A | * | 4/1981 | Zoller | 428/31 |
| 4,530,519 A | | 7/1985 | Marshall | |
| D281,061 S | | 10/1985 | Tortolani | |
| 4,726,614 A | * | 2/1988 | Myers et al. | 293/128 |
| 4,871,205 A | | 10/1989 | Bray | |
| D309,593 S | | 7/1990 | Bailey | |
| D315,542 S | | 3/1991 | Dalton et al. | |
| 5,060,994 A | | 10/1991 | Martin et al. | |
| 5,156,425 A | * | 10/1992 | Wagner | 293/128 |
| 5,267,763 A | | 12/1993 | Klein | |
| D358,358 S | | 5/1995 | Burroughs | |
| 5,536,540 A | * | 7/1996 | Borys et al. | 428/31 |
| D437,810 S | | 2/2001 | Runfola | |
| D446,484 S | | 8/2001 | Martel | |

* cited by examiner

*Primary Examiner*—Joseph D. Pape
(74) *Attorney, Agent, or Firm*—Charles J. Prescott

(57) ABSTRACT

A portable vehicle finish protection apparatus adapted for temporary magnetic installation on a vehicle when the vehicle is parked closely adjacent another vehicle and is therefore susceptible to exterior finish damage as a result of the edge of a door of the adjacent vehicle impacting against the side of the vehicle to be protected. The vehicle finish protection apparatus includes a unitary body formed of a relatively dense polyethylene closed cell foam material having first and second elongated bumper sections which are joined by a living hinge such that the first and second bumper sections are normally aligned in an operational configuration, but may be folded together at the hinge to effect a compact storage configuration. Each of the first and second bumper sections includes flat, flexible magnet panels distributed along its length to facilitate removably affixing the apparatus to the side of a vehicle by magnetic attraction.

9 Claims, 6 Drawing Sheets

PORTABLE VEHICLE FINISH PROTECTION APPARATUS

BACKGROUND OF THE INVENTION

1. Scope of Invention

This invention relates generally to protective devices for the outer surface of a motor vehicle, and more particularly to a portable vehicle protection apparatus magnetically attachable to the sides and doors of a vehicle to prevent adjacent vehicles from damaging the vehicle when a door of the adjacent vehicle is opened.

2. Prior Art

Substantial damage to the sides and doors of the exterior of a vehicle can result from an adjacent vehicle parking too close when the doors are carelessly opened during egress or ingress. The doors of modem cars have grown larger and heavier and, as a result, the reach and the momentum of these doors can easily inflict several hundred dollars of damage to the side of an adjacent parked car when the edge of the door strikes thereagainst.

Automobile manufacturers have throughout the years taken limited action to design door guards which attempt to resolve this issue of side and door damage. However, typically the OEM door edge guards provided by the manufacturer are easily damaged themselves upon higher force impact and therefore only add to the costly repairs required when such damage is inflicted. Moreover, the edge contour of doors can result in impact misalignment because the manufacturers' door guard is of insufficient thickness to prevent misaligned door edge contours of the adjacent vehicle from striking either above or below the placement of the decorative OEM door edge guard.

A number of prior art devices have been patented in an attempt to resolve this issue. The following are examples of those prior art efforts:

U.S. Pat. No. 4,871,205 to Bray
U.S. Pat. No. 5,060,994 to Martin, et al.
U.S. Pat. No. 5,267,763 to Klein
U.S. Pat. No. 4,530,519 to Marshall
U.S. Pat. No. D437,810 to Runfola
U.S. Pat. No. D358,358 to Burroughs
U.S. Pat. No. D315,542 to Dalton, et al.
U.S. Pat. No. D308,593 to Bailey
U.S. Pat. No. D281,061 to Tortolani
U.S. Pat. No. D446,484 to Martel Although magnet attachment of a side or door bumper guard is taught in one or more of the prior art devices, the present invention discloses additional improved structure including offset magnets from one bumper section to the next so that folding closure is facilitated for storage. A unique preferred cross sectional design provides multi-lobe configuration for gradual force dissipation, which will assist in better energy distribution and reduced likelihood of damage. Secure attachment of the magnetic flat panels against the inner surface of each of the elongated bumper sections prevents unintentional separation of the magnetic panels from the flexible bumper sections when the apparatus is stored within the vehicle during hot summer days when heat build-up can easily otherwise cause conventional adhesives to fail.

BRIEF SUMMARY OF THE INVENTION

This invention is directed to a portable vehicle finish protection apparatus adapted for temporary magnetic installation on a vehicle when the vehicle is parked closely adjacent another vehicle and is therefore susceptible to exterior finish damage as a result of the edge of a door of the adjacent vehicle impacting against the side of the vehicle to be protected. The vehicle finish protection apparatus includes a unitary body formed of a relatively dense polyethylene closed cell foam material having first and second elongated bumper sections which are joined by a living hinge such that the first and second bumper sections are normally aligned in an operational configuration, but may be folded together at the hinge to effect a compact storage configuration. Each of the first and second bumper sections includes flat, flexible magnet panels distributed along its length to facilitate removably affixing the apparatus to the side of a vehicle by magnetic attraction.

It is therefore an object of this invention to provide a portable vehicle exterior finish protection apparatus with improved use and storage features.

It is another object of this invention to provide a portable vehicle exterior side protection apparatus magnetically attachable to the sides of the vehicle and providing more aerodynamic end configurations to reduce the likelihood of the apparatus being wind-stripped away should the apparatus be inadvertently left in place as the vehicle is driven away.

Yet another object of this invention is to provide a portable vehicle exterior finish protection apparatus having substantially improved attaching means for the magnet panels which interconnect the device magnetically to the side of a vehicle.

In accordance with these and other objects which will become apparent hereinafter, the instant invention will now be described with reference to the accompanying drawings.

DETAILED DESCRIPTION OF THE INVENTION

Figure 4:
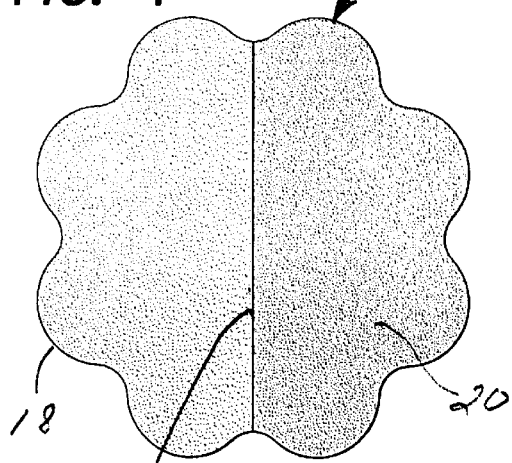
FIG. 4 is a distal end elevation view of the device of FIG. 1 in a folded or stored position.
Figure 5:
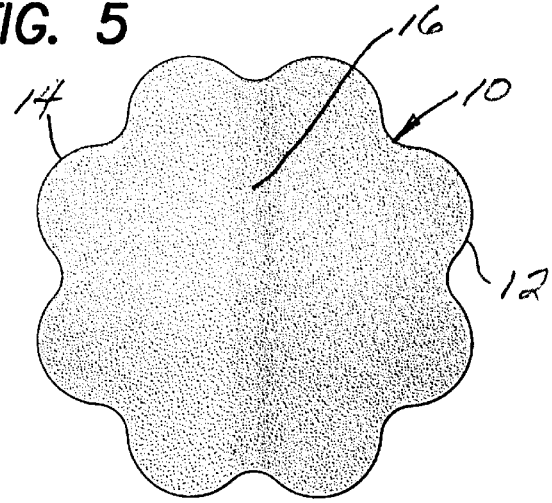
FIG. 5 is a proximal end elevation view of FIG. 4.
Figure 6:
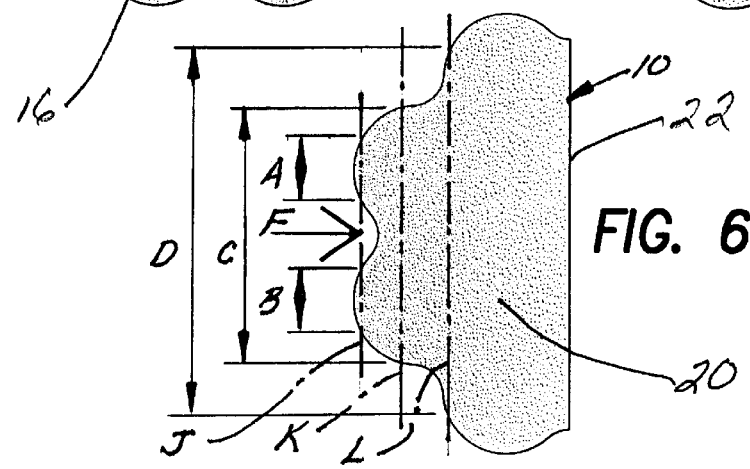
FIG. 6 is a view similar to FIG. 4 with the invention in an open position.

Referring now to the drawings and particularly to FIGS. 1 to 8, one embodiment of the invention is there shown generally at numeral 10. This embodiment of the invention 10 is formed as a unit of extruded polyethylene foam plastic which is self-skinning to form the extruded contoured section view as best seen in FIG. 6. The preferred density of the extruded polyethylene foam is 2.5 p.f.m. A sunscreen additive for reducing u.v.a. and u.v.b. sun damaging inhibitors is included with the polyethylene foam before extrusion. An elongated length of extruded polyethylene material is partially cut through or bevel notched at 16 to form a living hinge. The polyethylene foam in self-skinning form is of sufficient strength and integrity to allow the hinge 16 to withstand repeated opening and closing flexure of this living hinge 16 without fracture or deterioration.

Figure 1:
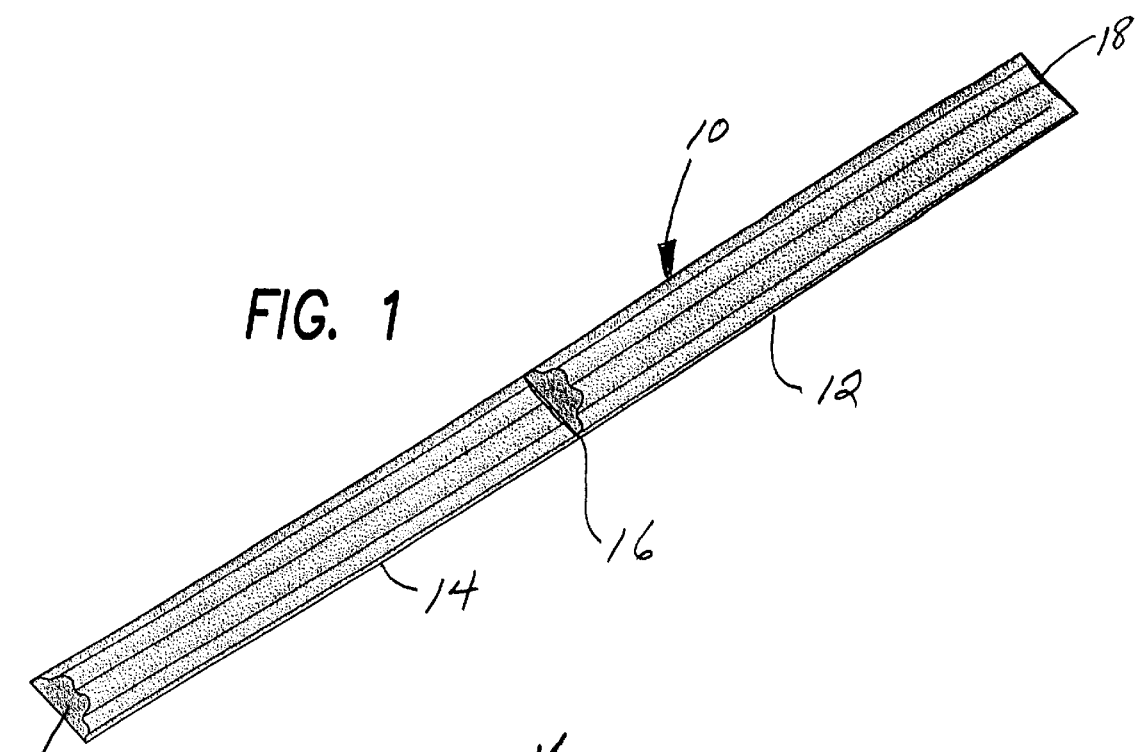
FIG. 1 is a perspective view of one embodiment of the invention in an extended position ready for deployment.
Figure 2:
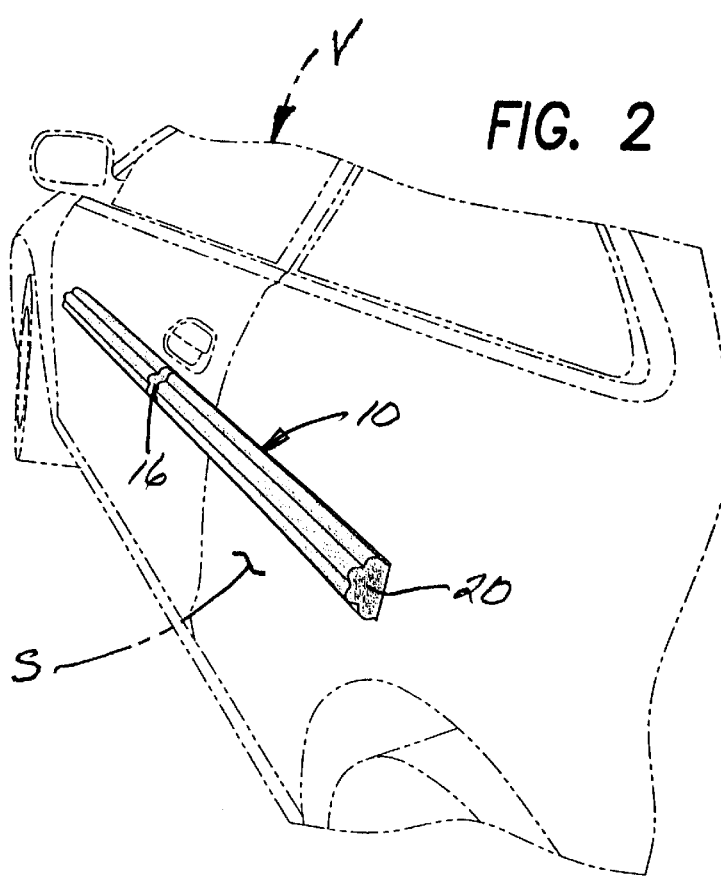
FIG. 2 is a rear perspective view of the invention of FIG. 1 deployed against the side of a vehicle.
Figure 3:
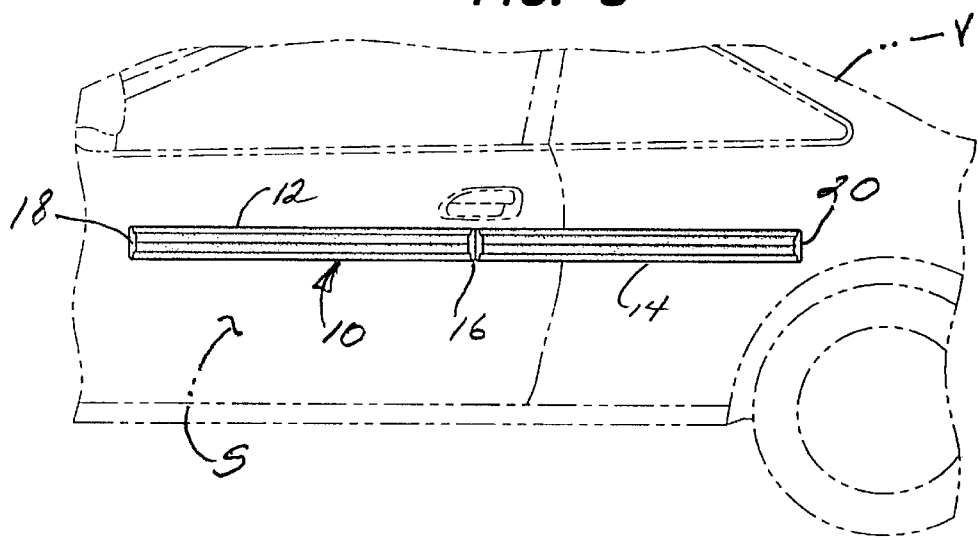
FIG. 3 is a side elevation view of FIG. 2.
Figure 7:
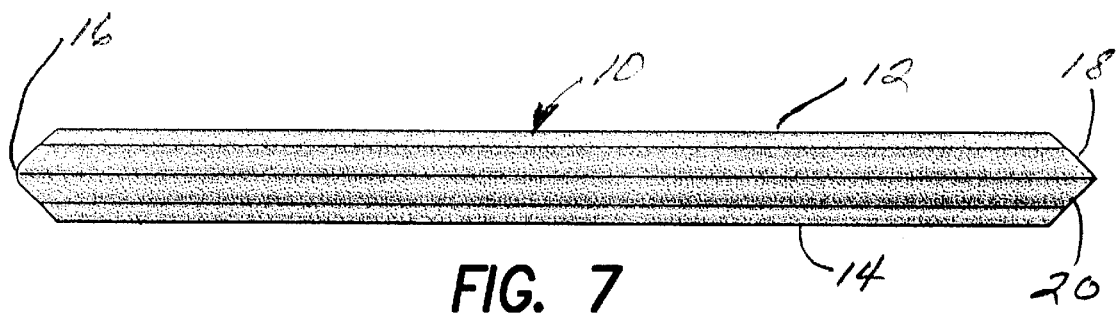
FIG. 7 is a side elevation view of the device of FIG. 1 is a closed, stored position.

The distal ends 18 and 20 of each of the flexible bumper sections 12 and 14, respectively, are tapered as best seen in FIG. 7 so that, if the device is inadvertently left attached to the sides of the vehicle V, as shown in FIGS. 2 and 3 and as more fully described herebelow, the wind resistance during vehicle V movement will be much less likely to detach or wind-strip the device 10 from the side S of the vehicle V.

The preferred cross section of the device 10 is best seen in FIGS. 4, 5 and 6. FIG. 6 has been dimensioned to show the effect of an impact of the edge of an adjacent vehicle door against the outer contoured surface of the device 10 when it is deployed onto the side S of the vehicle V. On initial light impact in the direction of arrow F, a total width of foam material is represented by the total of arrows A and B. However, should a larger impact be experienced by a heavier adjacent door, a width C of foam material increased in thickness as well must be compressed to absorb the impact. Should an extremely forceful impact in the direction of arrow F be struck against the device 10, a total width of arrow D and substantially increased foam thickness is available to be compressed to gradually absorb and dissipate the energy of the otherwise destructive swinging door and its trailing edge impacts against the outer contoured surface of the device 10. Thus, the unique multi-lobe arrangement of exterior contour configuration of the preferred embodiment 10 of the invention will more gradually dissipate and reduce the peak of the force from a swinging adjacent door so that deformation of the metal forming each of the doors, including the door edge guard of the striking door, will be substantially reduced.

Figure 8:
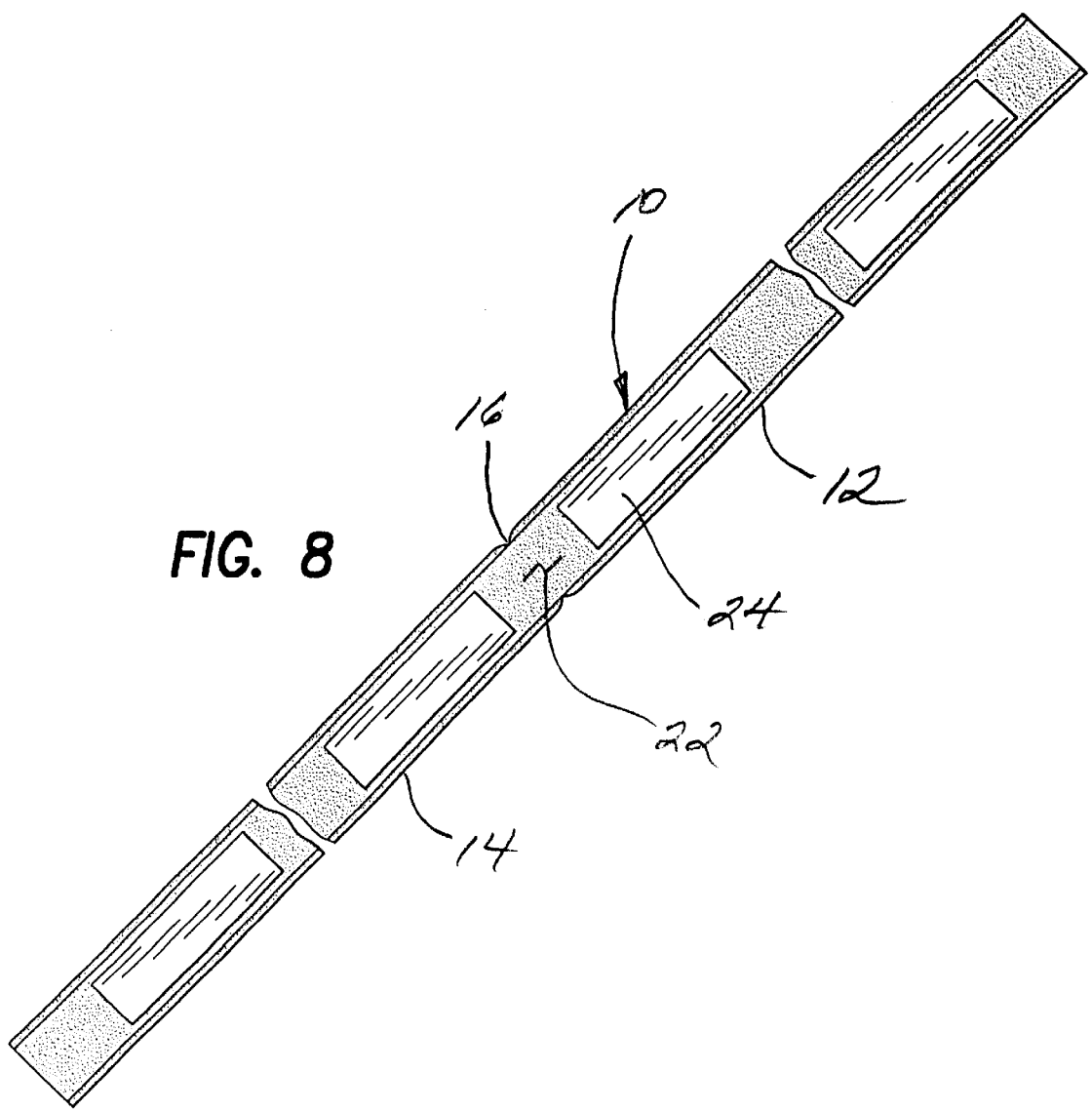
FIG. 8 is a bottom plan view of the inner surface of the invention shown in FIG. 1.

As seen in FIG. 8, a plurality of flat flexible magnet panels or strips 24 are shown adhered directly against the flat inner surface 22 of the device 10. These magnet panels 24 have a thickness of approximately 0.060". Attachment of each of the magnet panels 24 is effected, in this embodiment 10, by a permanent adhesive in the form of preferably a structurally adhesive by LOCK TIGHT, Catalog No. H3103 or using a marine sealant by 3M Corporation under the Designation "5200".

Figure 9:
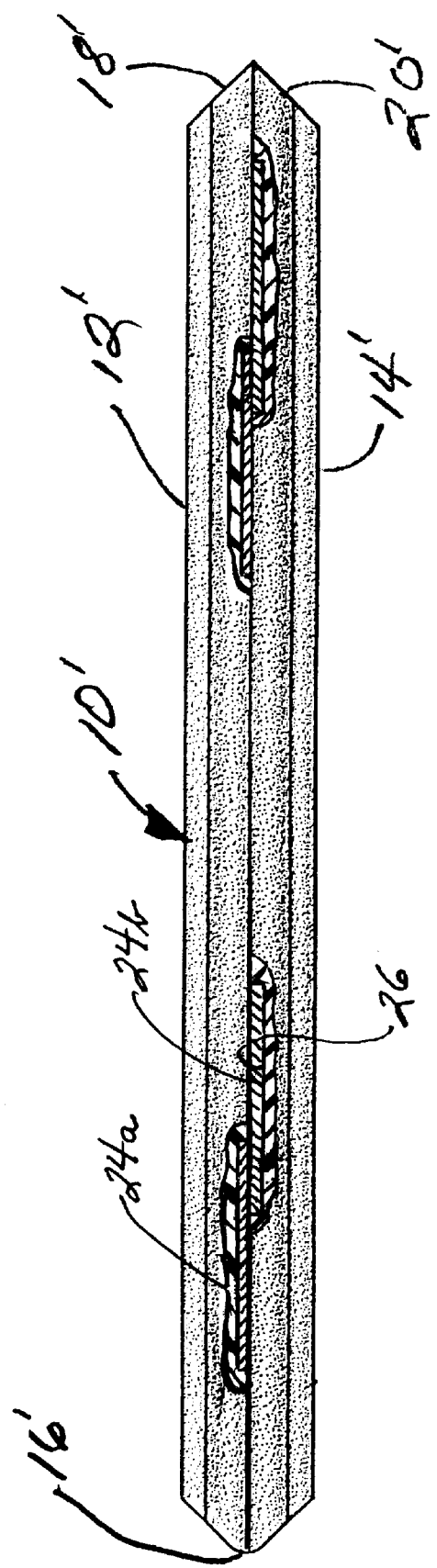
FIG. 9 is a side elevation broken view of a preferred alternate embodiment invention in a folded position for storage.

The embodiment of the invention 10' shown in FIG. 9 is substantially the same as the embodiment 10 described in FIGS. 1 to 8 except that the magnetic panels 24a and 24b are shown offset between the two flexible bumper sections 12' and 14' and are attached by adhesive layer as previously described into mating cavities 26. By offsetting the magnetic panels 24a and 24b as shown, when the device 10' is closed for storage, the magnet panels 24a and 24b are somewhat offset one from another to reduce the attractive force so that opening the two halves 12' and 14' is made easier while still maintaining the device 10' in a closed, stored position by more limited magnetic attraction of the opposing magnet panels 24a and 24b in this embodiment 10'. Proximal ends 18' and 20' and living hinge 16' are as previously described.

Figure 10:
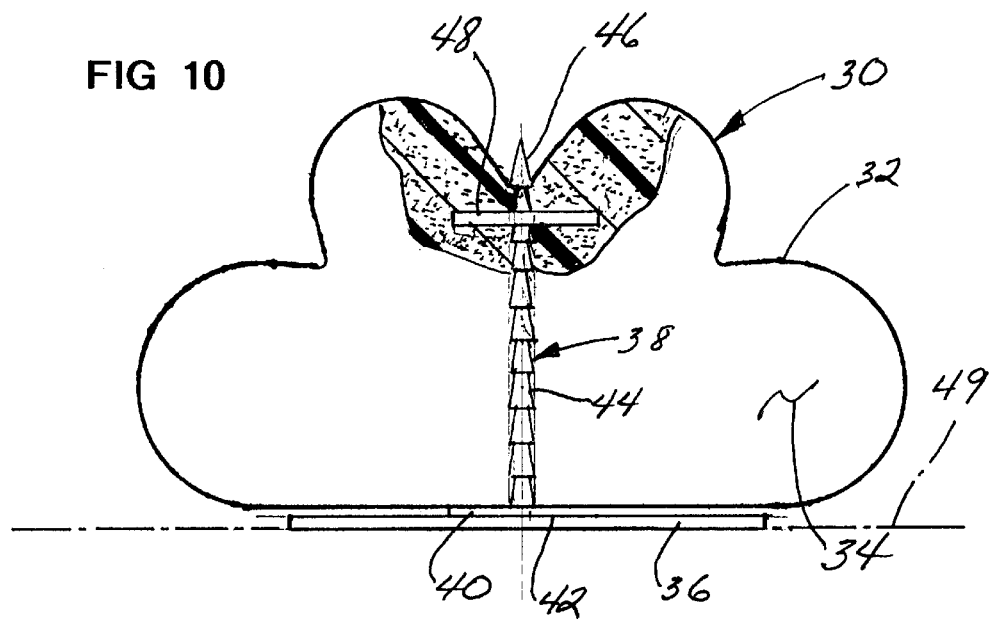
FIG. 10 is a broken end elevation view of still another embodiment of the invention.

The embodiments shown in FIGS. 10 to 13 represent various embodiments of mechanical attachment of the flat flexible magnet panels there shown. In FIG. 10, the magnet panel 36 is attached as shown with the outer contact surface coplanar or aligned with the contact surface 49 which magnetically engages against the sides of the vehicle V. The mode of attachment of the magnet panel 36 to the inner surface of the bumper section 32 is entirely mechanical in nature. An elongated commercial available molded plastic rivet 38 includes an elongated shank 44 with serrations or barbs therealong. An enlarged head 40 is initially permanently glued to the inner surface of the magnet panel 36. Thereafter, the serrated shank 44 is pierced through the central portion of foam 34 each bumper section 32 aided by the pointed tip 46. When the tip 46 extends through the exposed portion of the exterior or outer surface of the bumper section 32, preferably between the two central lobes, a retaining button 48 lockably engages over each of the serrations or barbs to the extent of the compressibility of the surrounding foam material 34 of each bumper section 32. By this means, very tight locking engagement is achieved by the strong compression of the foam material 34. Although it is anticipated that each of the magnet panels 36 will be in spaced relation to the inner surface of each of the bumper sections 32 equal to the thickness of the magnet panel 36 and that of head 40, a stronger compression and locking interengagement with the locking button 48 on the next inward serration along shank 44 will cause the head 40 to slightly compress into the foam material 34 to essentially place the magnet panel 36 in direct contact against the inner surface of the bumper section 34.

Figure 11:
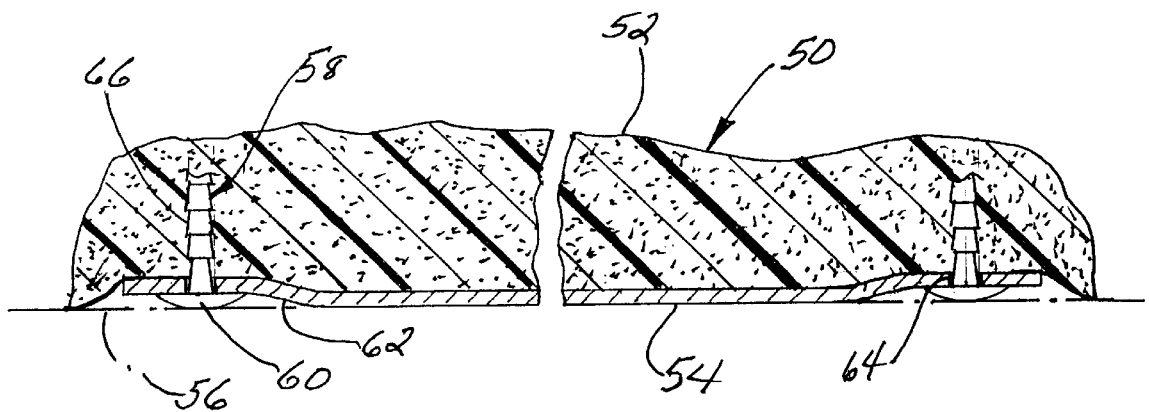
FIG. 11 is a partial side section view of still another embodiment of the invention.

In FIG. 11, the magnet panel 54 is somewhat elongated and includes two pierced or machined holes 64 formed adjacent each end thereof and along the longitudinal centerline of the magnet panel 54. Each aperture 64 is sized to receive the serrated shank 66 of a rivet 58 as previously described. In this embodiment 50, the head 60 is placed on the exposed or outer surface of each magnet panel 54 and then, as above described, the mechanical engagement between the serrations along the shank 66 of rivet 58 are more fully engaged with a locking button (not shown) so that the flexible magnet panel 54 will resiliently deform at 62 so as to draw the magnet panel end portions along with head 60 of the rivet 58 into the foam material. By this arrangement, a more positive engagement is achieved by the head 60 of each of the rivets 58 and the exposed surface 56 of each of the magnet panels 54 will fully engage against the exterior surface of the side of the vehicle for maximal retention.

Figure 12:
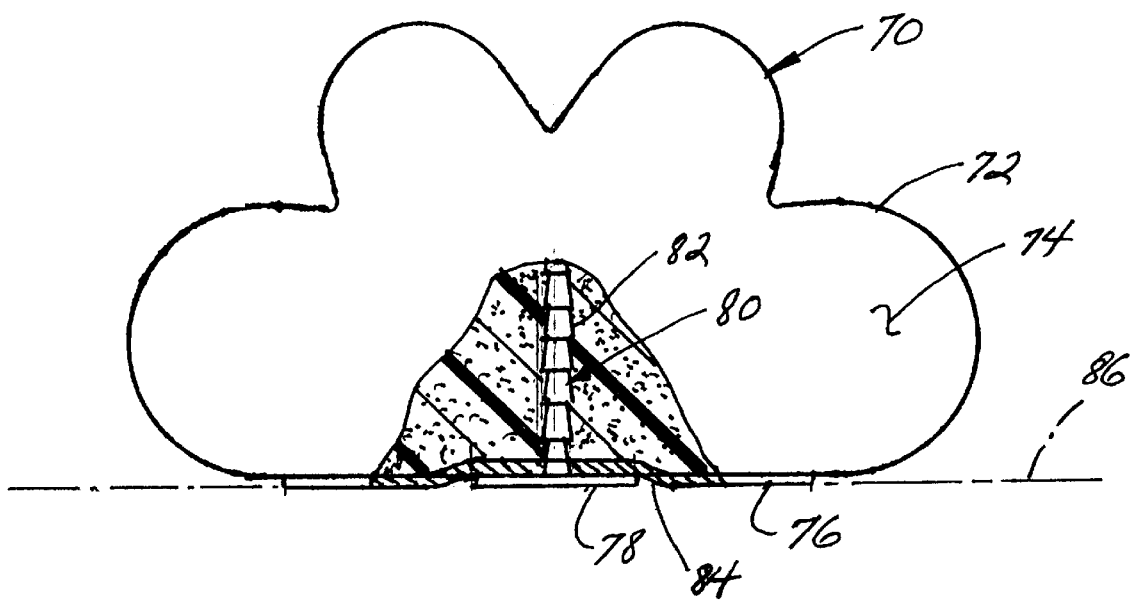
FIG. 12 is a broken end elevation view of yet another embodiment of the invention.

A similar concept is disclosed at 70 in FIG. 12 wherein the rivet 80 with its serrated shank 82 is fully pierced into the foam material 74 forming each of the bumper sections 72 so that the enlarged head 78 urges the magnet panel 76 to distort into the foam material as shown. Again, by this tight interengagement between the serrated shank 82 of rivet 80 with the locking button (not shown), very tight mechanical attachment of the magnet panel 76 is achieved such that the head 78 is coplanar with the exterior surface 86 of each magnet panel 76 to maximize the magnetic attraction and support against the side of the vehicle.

Figure 13:
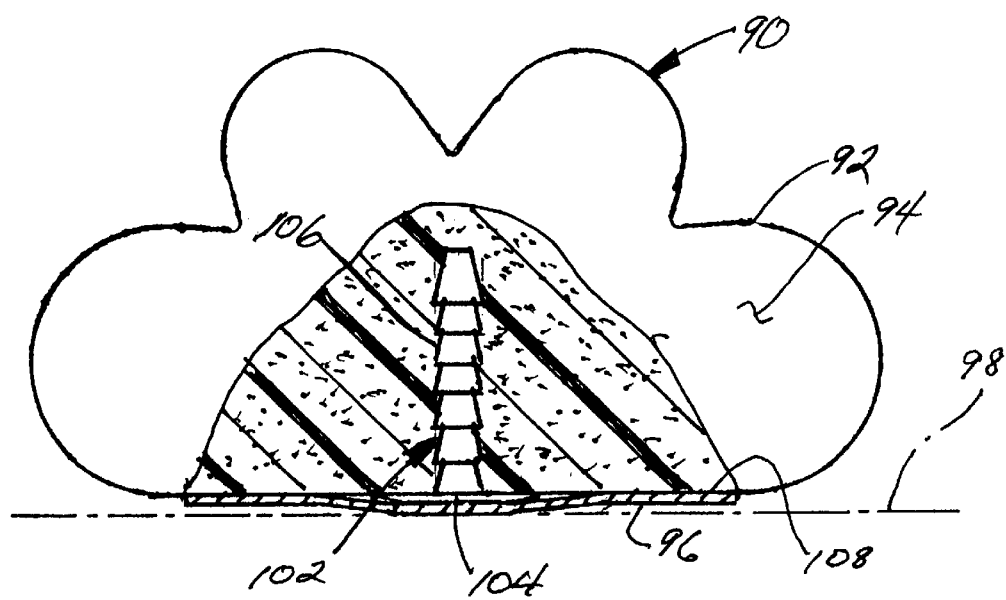
FIG. 13 is a broken end elevation view of still another embodiment of the invention.

Another type of rivet is shown in FIG. 13 at 102. This rivet 102 is of a series NR by Richco and is self-locking with larger serrations 106 into the foam material 94 of each bumper section 92. In this embodiment 90, the head 104 of the rivet 102 is permanently adhered to the inner surface 108 of the magnet panel 96 and the entire arrangement is forcibly urged against the inner surface of each bumper section 92. The length and size of the serrations along shank 106 are such as to prevent withdrawal once set into this type of polyethylene foam material. The density of the foam 94 is increased as previously reported up to about 2.5 p.f.m. to insure rigid mechanical retention of the shank 106. Although the head 104 of the rivet 102 is shown against the inner surface of the bumper section 92, it is anticipated that, by forcible urging of the rivet 102 into the foam 94, the head of the rivet 104 will embed fully into the foam 94 and allow the magnet panel 96 to take a less distorted or more flat configuration than that shown in FIG. 13. A layer of adhesive at 108 is also utilized to enhance the permanent attachment of the magnet panel 96. Contact surface at 98 which will bear against the side of the vehicle.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A portable vehicle finish protection apparatus adapted for temporary installation onto a side surface of a vehicle when the vehicle is parked closely adjacent another vehicle and is therefore susceptible to finish damage as a result of the edge of a door of such adjacent vehicle impacting against the side of the vehicle to be protected, comprising;

a unitary body having a first and a second elongated flexible bumper section each having proximal and distal ends;

said unitary body being fabricated from a resiliently deformable foam material and having a substantially flat inner surface and a contoured outer surface;

a plurality of flat, flexible magnet panels distributed along the length of said first and second bumper sections and permanently attached to said flat inner surface thereof;

a first portion of said plurality of magnet panels attached to said first bumper section spaced differently in distance from said living hinge than is a second portion of said plurality of magnet panels attached to said second bumper section whereby said first and second portions of said magnet panels are misaligned one to another to reduce the magnetic attraction force therebetween when said apparatus is folded about said living hinge for storage;

a living hinge coupling said proximal end of said first bumper section to said proximal end of said second bumper section such that the inner surfaces of said first and second bumper sections are normally aligned in a deployed configuration in use, but may be folded together at said hinge to effect a storage configuration;

each distal end of each of said bumper sections tapered to reduce wind drag tending to inadvertently detach said apparatus from deployed engagement against the side surface when the vehicle is under way.

2. A portable vehicle finish protection apparatus as set forth in claim 1, wherein said contoured outer surface of each said bumper section includes:

multi-arcuately-shaped longitudinal lobes which deform at a gradually increasing impact load rate whereby impact energy from the door of the adjacent vehicle is gradually dissipated and permanent damage to the vehicle or the adjacent vehicle is substantially avoided.

3. A portable vehicle finish protection apparatus as set forth in claim 1, wherein:

each magnet panel of said plurality of magnet panels is permanently attached to said flat inner surface by a permanent adhesive therebetween.

4. A portable vehicle finish protection apparatus as set forth in claim 1, wherein:

each magnet panel of said plurality of magnet panels is permanently attached against said inner surface by a plurality of plastic rivets each of which have an enlarged, generally flat head and a barbed shank which, when pierced into the foam material, is substantially permanently retained therein against removal therefrom.

5. A portable vehicle finish protection apparatus as set forth in claim 4, wherein:

each said flat head is permanently adhered against an inner surface of one said magnet panel.

6. A portable vehicle finish protection apparatus as set forth in claim 4, wherein:

each said flat head bears against an outer surface of one said magnet panel when said barbed shank is fully inserted through one of a plurality of holes formed through each said magnet panel and is fully inserted into and securely retained in the foam material.

7. A portable vehicle finish protection apparatus as set forth in claim 4, further comprising:

a plastic button having a central aperture structured for progressive locking engagement over a distal portion of said shank when said distal portion is pierced through said flexible bumper section to extend outwardly from said contoured outer surface.

8. A portable vehicle finish protection apparatus as set forth in claim 6, wherein:

each said rivet is tightly attached into said bumper section with sufficient force to deform and retain said magnet panel such that the outer surface of said magnet panel aligns with the inner surface of said bumper section to maximize surface contact of said apparatus against the side surfaces of the vehicle.

9. A portable vehicle finish protection apparatus adapted for temporary installation onto a side surface of a vehicle when the vehicle is parked closely adjacent another vehicle and is therefore susceptible to finish damage as a result of the edge of a door of such adjacent vehicle impacting against the side of the vehicle to be protected, comprising:

a unitary body having a first and a second elongated flexible bumper section each having proximal and distal ends;

said unitary body being fabricated from a resiliently deformable foam material and having a substantially flat inner surface and a contoured outer surface;

a plurality of flat, flexible magnet panels distributed along the length of said first and second bumper sections and permanently attached to said flat inner surface thereof;

a living hinge coupling said proximal end of said first bumper section to said proximal end of said second bumper section such that the inner surfaces of said first and second bumper sections are normally aligned in a deployed configuration in use, but may be folded together at said hinge to effect a storage configuration;

each distal end of each of said bumper sections tapered to reduce wind drag tending to inadvertently detach said apparatus from deployed engagement against the side surface when the vehicle is under way;

a first portion of said plurality of magnet panels attached to said first bumper section spaced differently in distance from said living hinge than is a second portion of said plurality of magnet panels attached to said second bumper section whereby said first and second portions of said magnet panels are misaligned one to another to reduce the magnetic attraction force therebetween when said apparatus is folded about said living hinge for storage.

* * * * *